United States Patent Office 3,407,223
Patented Oct. 22, 1968

3,407,223
PROCESS FOR PRODUCING SATURATED
ALIPHATIC NITRILES
Naoya Kominami, Tokyo, Hitoshi Nakajima, Urawa-shi, and Nobuhiro Tamura, Tokyo, Japan, assignors to Asahi Kasei Kogyo Kabushiki Kaisha, Osaka, Japan, a corporation of Japan
No Drawing. Filed Jan. 20, 1966, Ser. No. 521,817
Claims priority, application Japan, Apr. 2, 1965, 40/18,920; Aug. 27, 1965, 40/52,133; Oct. 8, 1965, 40/61,380; Oct. 20, 1965, 40/63,949, 40/63,950; Oct. 30, 1965, 40/66,321
12 Claims. (Cl. 260—465.3)

ABSTRACT OF THE DISCLOSURE

A process for producing saturated aliphatic nitriles by subjecting a gas containing ethylene or propylene and hydrogen cyanide to a catalytic addition reaction at a temperature of 200°–600° C., in the presence of a catalyst consisting of palladium, rhodium or salts thereof and phosphoric acid, ammonium or aluminum rhodanate or aluminum chloride.

---

This invention relates to a process for producing saturated aliphatic nitriles in high yields and at high selectivity by passing a gas containing a lower olefinic hydrocarbon and hydrogen cyanide over a catalyst to effect catalytic addition reaction at an elevated temperature according to the equation $$C_nH_{2n} + HCN \rightarrow C_nH_{2n+1}CN \qquad (1)$$

As processes for producing saturated aliphatic nitriles from lower olefinic hydrocarbons and hydrogen cyanide, there are known a process carried out in the liquid phase under a high pressure using cobalt carbonyl as a catalyst (J. Am. Chem. Soc., 76, 5364); a process carried out in the gas phase using active alumina or the like as a catalyst (United States Patent 2,455,995); a process conducted in the gas phase at an elevated temperature of from 475° to 700° C. using a noble metal of Group VIII as a catalyst (U.S. Patent 3,057, 906); and a process effected using nickel or cobalt metal or a cyanide thereof as a catalyst (British Patent 687,014).

Among the above processes, the process using cobalt carbonyl as a catalyst suffers from such drawback that the catalyst is required in large amount and is deactivated in each single operation, and the regeneration of the catalyst is difficult and expensive. The process using active alumina or the like as a catalyst is low in selectivity with respect to the reaction shown by Equation 1 as well as in catalyst activity and hence is not applicable to the reaction of ethylene with hydrogen cyanide. According to the process using a noble metal of Group VIII as a catalyst, acetonitrile is by-produced in large quantities and the selectivity and yield of the product in accordance with the reaction shown by the Equation 1 are markedly low. In the process using nickel or cobalt metal or a cyanide thereof as a catalyst, the catalyst is quickly lowered in activity by the lapse of time and cannot be regenerated with ease.

As a result of various studies carried out in order to attain a commercially excellent process for the production of saturated aliphatic nitriles, the present inventors have found that saturated aliphatic nitriles can be obtained in high yields and at high selectivity by subjecting a lower olefinic hydrocarbon and hydrogen cyanide to a gas phase catalytic addition reaction at an elevated temperature using a catalyst prepared from (i) palladium or rhodium metal or a compound thereof, (ii) phosphoric acid and (iii), if necessary, ammonium rhodonate, aluminum rhodanate or aluminum chloride. The terms "ammonium rhodanate" and "aluminum rhodanate" are respectively synonomous with "ammonium thiocyanate" and "aluminum thiocyanate" and are not to be mistakenly confused with or considered as "rhodium compounds," notwithstanding the similarity therebetween with respect to the spelling thereof. The inventors have also found that when the above reaction is conducted in the presence of a catalyst prepared from (i) palladium or rhodium metal or a compound thereof and (ii) ammonium rhodanate, aluminum rhodanate or aluminum chloride, there are formed saturated aliphatic nitriles in high yields and at high selectivity, and that when the same reaction as above is effected in the presence of a catalyst prepared from palladium or rhodium metal or a compound thereof, phosphoric acid and ammonium rhodanate, aluminum rhodanate or aluminum chloride, it is possible to obtain saturated aliphatic nitriles in higher yields.

It is therefore the object of the present invention to provide a process for producing saturated aliphatic nitriles by subjecting a gas containing a lower olefinic hydrocarbon and hydrogen cyanide to a catalytic addition reaction at an elevated temperature, in which the reaction is effected in the presence of a catalyst prepared from at least one member selected from the group consisting of palladium, rhodium and compounds of palladium and rhodium; phosphoric acid; and/or at least one member selected from the group consisting of ammonium rhodanate, aluminum rhodanate and aluminum chloride.

Table 1 shows a comparison in catalyst activity between the case where the catalyst is prepared by incorporation of phosphoric acid and the case where no phosphoric acid is incorporated. As seen in Table 1, the incorporation of phosphoric acid greatly increases the catalyst activity.

Table 2 shows a comparison in catalyst activity between the case where the catalyst is prepared by incorporation of ammonium rhodanate, aluminum rhodanate or aluminum chloride and the case where no such compound is incorporated.

Table 3 indicates a comparison in catalyst activity between the case where the catalyst is prepared by incorporation of phosphoric acid and ammonium rhodanate, aluminum rhodanate or aluminum chloride.

In the present invention the compounds of palladium and rhodium include halides such as chlorides and bromides, carboxylates such as oxalates and acetates, hydroxides, oxides and cyanide.

The phosphoric acid to be used in the process of the present invention includes phosphoric acid, pyrophosphoric acid and phosphoric anhydride. The amount of phosphoric acid to be incorporated is preferably within the range of from 5 to 200% based on the weight of palladium or rhodium or on the total weight of the two.

The amount of ammonium rhodanate, aluminum rhodanate, aluminum chloride or a mixture thereof is preferably within the range of 6 to 30,000% based on the weight of palladium or rhodium or on the total weight of the two.

The catalyst of the present invention may be prepared according to any of a number of conventional processes such as immersion process, mixing process and the like. In this case, the use of a carrier is not always required but is preferable. Usable carriers include active carbon, alumina, silica alumina, titania, silica boria, alumina boria and the like. Active carbon and alumina are particularly preferred because they provide high activity catalysts. Alumina is particularly preferable when ammonium rhodanate, aluminum rhodanate or aluminum chloride is to be incorporated. The use of alumina is most preferred in terms of catalyst life. A preferable form of alumina is active alumina.

The catalyst thus prepared may be used as such, but is desirably used after treatment with a reducing agent. In this case, the reducing agent to be used includes hydrogen, aliphatic hydrocarbons, carbon monoxide and Formalin. The temperature at which the reducing agent treatment is to be conducted is preferably from 30° to 500° C.

Table 4 shows a comparison in catalyst activity between the case where the catalyst is used as such and the case where it is used after treatment with a reducing agent.

Among the lower olefinic hydrocarbons which may be treated according to the process of the present invention are ethylene and propylene, and the main products are propionitrile from ethylene, and isobutyronitrile and normal-butyronitrile from propylene.

In practicing the present invention, the presence of an inert gas is not necessarily required but is not objectionable. The inert gas which may be present includes nitrogen, methane, ethane, propane and carbon dioxide.

In the present invention, the molar ratio of the lower olefinic hydrocarbon and hydrogen cyanide may be at or about a stoichiometric ratio, or one of them may be used in excess. Generally, however, a molar ratio within the range of from 20 to 1/20 is adopted.

The temperature adopted in the present invention is 200° to 600° C., preferably 200° to 450° C.

The process of the present invention is carried out at atmospheric pressure but may also be effected under pressure.

Further, the reaction may be conducted according to any type of fixed bed, movable bed or fluidized bed.

In practicing the process of the present invention, there is observed a decrease in catalyst actvity with the lapse of time. In this case, the feeding of the starting gas is discontinued and the catalyst is heated while introducing oxygen or a gas containing molecular oxygen such as air, whereby the catalyst activity is easily restored. This regeneration operation is preferably effected before the activity has decreased to 30% of the maximum activity, and the regeneration temperature is preferably from 200° to 600° C., more preferably between the saturated aliphatic nitrile synthesis temperature and 600° C.

The following examples illustrate in detail the present invention but are not to be construed as limiting the scope thereof:

Example 1

4.1 g. of rhodium chloride were dissolved in dilute hydrochloric acid. To the solution, 5 ml. of 85% phosphoric acid was added, and further 100 ml. of active alumina were added, and the mixture was vaporized to dryness on a hot water bath to obtain the catalyst. 20 ml. of this catalyst were charged in a Pyrex glass U-shaped tube of 16 mm. outer diameter which had been placed in a niter bath maintained at 350° C., and hydrogen was passed into the catalyst for 3 hours to reduce the rhodium chloride to rhodium. Subsequently, a mixed gas comprising ethylene, hydrogen cyanide and nitrogen at a volume ratio of 2:1:1 was passed at a flow rate of 74 ml./min. 80% of the fed hydrogen cyanide was converted, and 93% of the converted hydrogen cyanide became propionitrile.

Example 2

4.1 g. of rhodium chloride were dissolved in dilute hydrochloric acid. To the solution, 2.7 g. of pyrophosphoric acid were added and further 100 ml. of active carbon were added, and the mixture was vaporized to dryness on a hot water bath to obtain a catalyst. 15 ml. of this catalyst were treated in a hydrogen current at 300° C. for 3 hours, and then a mixed gas comprising ethylene, hydrogen cyanide and nitrogen at a volume ratio of 3:1:2 was passed at a flow rate of 45 ml./min. 90% of the fed hydrogen cyanide was converted, and 97% of the converted hydrogen cyanide became propionitrile.

Example 3

2.1 g. of rhodium chloride were supported on 100 ml. of active carbon, and the mixture was maintained in Formalin at room temperature for 3 hours. After the addition of 2.4 ml. of phosphoric acid, the mixture was vaporized to dryness to obtain a catalyst. 20 ml. of this catalyst were kept at 400° C. and a mixed gas comprising ethylene, hydrogen cyanide and nitrogen at a volume ratio of 2:1:2 was passed therein at a flow rate of 120 ml./min. 71% of the fed hydrogen cyanide was converted, and 93% of the converted hydrogen cyanide became propionitrile.

Example 4

Examples in which there were used catalysts prepared from the chloride, bromide, iodide, cyanide, hydroxide and acetate of rhodium and phosphoric acids are shown in Table 5.

Example 5

0.4 g. of rhodium chloride was dissolved in dilute hydrochloric acid. To the solution, 1.5 g. of ammonium rhodanate were added and further 20 ml. of granular active alumina was added, and the mixture was heated to dryness on a hot water bath to obtain a catalyst. 2 ml. of this catalyst were charged in a Pyrex glass U-shaped tube of 9 mm. outer diameter which had been placed in a niter bath maintained at 350° C. After introducing only ethylene for one hour, a mixed gas comprising ethylene, hydrogen cyanide and nitrogen at a volume ratio of 5:2:5 was passed at a flow rate of 74 ml./min. 92% of the fed hydrogen cyanide was converted, and 90% of the converted hydrogen cyanide became propionitrile.

Example 6

Examples in which there were used catalysts prepared from the cyanide, bromide, acetate and oxalate of rhodium and ammonium rhodanate and, in some cases, in combination with phosphoric acid are shown in Table 6.

Example 7

0.7 g. of palladium chloride was dissolved in dilute hydrochloric acid. To the solution, 1.5 ml. of 85% phosphoric acid and 2 g. of aluminum chloride (hydrated) were added, and then 20 ml. of active alumina were further added, and the mixture was vaporized to dryness with thorough stirring to obtain a catalyst. 2 ml. of this catalyst were filled in a Pyrex glass made U-shaped tube of 9 mm. outer diameter which had been placed in a niter bath maintained at 350° C., and was treated in a hydrogen current for one hour. Subsequently, a mixed gas comprising ethylene, hydrogen cyanide and nitrogen at a volume ratio of 3:2:5 was passed at a flow rate of 100 ml./min. 60% of the fed hydrogen cyanide was converted, and 81% of the converted hydrogen cyanide became propionitrile.

Example 8

5 g. of palladium chloride supported on 30 ml. of silica alumina were immersed in 30 ml. of Formalin for 3 hours, and was then filtered and dried. The dried substance was immersed in an aqueous solution containing 36 g. of aluminum rhodanate and the solution was vaporized to dryness to obtain a catalyst. 5 ml. of this catalyst were filled in a reaction tube maintained at 350° C. and a mixed gas comprising ethylene, hydrogen cyanide and ethane at a volume ratio of 3:1:7 was fed at a flow rate of 77 ml./min. 49.5% of the fed hydrogen cyanide was converted, and 70% of the converted hydrogen cyanide became propionitrile.

Example 9

Examples in which there were used catalysts prepared from palladium iodide, palladium cyanide, palladium oxalate, rhodium chloride, aluminum chloride and aluminum rhodanate are shown in Table 7.

Example 10

Propylene was passed at 400° C. for 2 hours into 6 ml. of a catalyst. The catalyst had been prepared from 0.9 g. of rhodium oxalate, 0.7 g. of pyrophosphoric acid, 5 g. of aluminum rhodanate and 20 ml. of alumina boria. Subsequently, a mixed gas comprising propylene, hydrogen cyanide and nitrogen at a volume ratio of 3:1:7 was introduced at a flow rate of 165 ml./min. 87% of the introduced hydrogen cyanide was converted, and 63% of the converted hydrogen cyanide became isobutyronitrile and 25% became normal butyronitrile.

Example 11

0.8 g. of palladium chloride and 0.1 g. of rhodium chloride were dissolved in dilute hydrochloric acid. To the solution, 0.7 ml. of 85% phosphoric acid was added and further 2.6 g. of aluminum chloride (hydrated) and 1.7 g. of aluminum rhodanate were added. The mixture was further incorporated with 20 ml. of active alumina and was then vaporized to dryness with thorough stirring to obtain a catalyst. 1 ml. of this catalyst was filled in a reaction tube maintained at 300° C. Into the catalyst, hydrogen was passed for 3 hours and then a mixed gas comprising propylene, hydrogen cyanide and propane at a volume ratio of 4:2:5 was introduced at a flow rate of 88 ml./min. 87% of the introduced hydrogen cyanide was converted, and 61% of the converted hydrogen cyanide became isobutyronitrile and 30% became normal butyronitrile.

Example 12

A catalyst was prepared from 1 g. of rhodium chloride, 10 g. of aluminum rhodanate, 7.6 g. of ammonium rhodanate and 100 ml. of active alumina. 3 ml. of the catalyst was treated in a hydrogen current at 350° C. for 1 hour. Thereafter, a mixed gas comprising ethylene and hydrogen cyanide was introduced into the catalyst at 425° C. at a flow rate of 180 ml./min. 94% of the introduced hydrogen cyanide was converted, and 96% of the converted hydrogen cyanide became propionitrile.

Example 13

Examples in which there were used catalysts prepared from the iodide, bromide and chloride of palladium and phosphoric acids are shown in Table 8.

Example 14

A catalyst was prepared from 4.5 g. of palladium acetate, 1.3 g. of phosphoric acid and 100 ml. of active alumina. 40 ml. of the catalyst were maintained at 350° C. Into the catalyst, a mixed gas comprising propylene, hydrogen cyanide and nitrogen at a volume ratio of 2:1:10 was introduced at a flow rate of 75 ml./min. 81% of the introduced hydrogen cyanide was converted, and 47.1% of the converted hydrogen cyanide became isobutyronitrile and 8.7% became normal butyronitrile.

Example 15

To an aqueous hydrochloric acid solution containing 21.3 g. of palladium chloride, an aqueous sodium hydroxide solution was added until the pH became 8–9, and the resulting palladium hydroxide precipitate was separated by filtration. To the precipitate, 18.3 cc. of an aqueous solution of 30% phosphoric acid was added, and the resulting liquid was incorporated with 100 ml. of titania in the form of a gel, and the mixture was shaped and dried to obtain a catalyst. 15 cc. of this catalyst were filled in a reaction tube and maintained at 350° C. Into the catalyst, a mixed gas comprising ethylene and hydrogen cyanide at a volume ratio of 5:2 was introduced, after dilution with nitrogen, at a flow rate of 75 ml./min.

87% of the introduced hydrogen cyanide was reacted, and 71% of the reacted hydrogen cyanide became propionitrile.

Example 16

To an aqueous hydrogen cyanide solution, 2.6 g. of palladium cyanide and 5.6 ml. of 85% phosphoric acid were added. The mixture was incorporated with 100 ml. of granular active alumina and was vaporized to dryness to obtain a catalyst. 20 ml. of this catalyst were packed in a reaction tube maintained at 300° C. Into the catalyst, a mixed gas comprising ethylene, hydrogen cyanide and ethane at a volume ratio of 1:1:6 was introduced at a flow rate of 216 ml./min. 64.1% of the introduced hydrogen cyanide was converted, and 94.0% of the converted hydrogen cyanide became propionitrile.

Example 17

4.6 g. of palladium nitrate were dissolved in nitric acid. To the solution, 3.2 ml. of 85% phosphoric acid and 7.6 g. of ammonium rhodanate were added. The resulting mixture was incorporated with 150 ml. of active alumina and was vaporized to dryness on a hot water bath to obtain a catalyst. 3 ml. of this catalyst were charged in a Pyrex glass U-shaped tube of 10 mm. outer diameter which had been placed in a niter bath maintained at 350° C. After treating the catalyst with hydrogen for 3 hours, a mixed gas comprising ethylene, hydrogen cyanide and nitrogen at a volume ratio of 5:2:5 was introduced into the catalyst at a flow rate of 72 ml./min. 89% of the introduced hydrogen cyanide was converted, and 85% of the converted hydrogen cyanide became propionitrile.

Example 18

Examples in which there were used catalysts prepared from the chloride, iodide and cyanide of palladium and phosphoric acids and then treated in a hydrogen current at 300° C. for 1 hour are shown in Table 9.

Example 19

3.5 g. of palladium chloride were dissolved in dilute hydrochloric acid. To the solution, 14.0 g. of ammonium rhodanate were added, and the resulting mixture was incorporated with 150 ml. of active alumina and was then vaporized to dryness on a hot water bath to obtain a catalyst. 3 ml. of this catalyst were charged in a U-shaped reaction tube which had been placed in a niter bath maintained at 300° C., and was treated with hydrogen for 2 hours. Into the catalyst, a mixed gas comprising ethylene and hydrogen cyanide at a volume ratio of 2:1 was introduced at a flow rate of 45 ml./min. 51% of the introduced hydrogen cyanide was converted, and 85% of the converted hydrogen cyanide became propionitrile.

Example 20

10.7 g. of palladium chloride were dissolved in hydrochloric acid. To the solution, an aqueous sodium hydroxide solution was added dropwise to adjust the pH thereof to 8–9, and the resulting palladium hydroxide precipitate was separated by filtration. To the precipitate, 5.2 ml. of 85% phosphoric acid and 12.4 g. of ammonium rhodanate were added. The resulting mixture was incorporated with 200 ml. of a silica sol containing 20% by weight of silica, was stirred while elevating the temperature and was then dried to obtain a catalyst. 5 ml. of this catalyst were packed in a reaction tube. Into the catalyst, ethylene was passed for 2 hours at 350° C., and then a mixed gas comprising ethylene, hydrogen cyanide and ethane at a volume ratio of 5:2:9 was introduced at a flow rate of 90 ml./min. 69% of the introduced hydrogen cyanide was converted and 77% of the converted hydrogen cyanide became propionitrile.

Example 21

Experiments were conducted for long periods, while inserting regeneration treatment, using a palladium cyanide - phosphoric acid - active alumina catalyst, a rhodium chloride - ammonium rhodanate - active alumina catalyst and a palladium chloride - rhodium chloride - phosphoric acid - aluminum chloride - aluminum rhodanate - active alumina catalyst. The results are shown in Table 10.

TABLE 1.—EFFECTS OF PHOSPHORIC ACID IN SYNTHESIS OF PROPIONITRILE FROM ETHYLENE AND HYDROGEN CYANIDE

| Catalyst | | Temp. (°C.) | Space velocity (hr.⁻¹) | Inlet gas volume ratio | | | Cyanic acid conversion (percent) | Propionitrile selectivity based on hydrogen cyanide (percent) |
|---|---|---|---|---|---|---|---|---|
| Palladium or rhodium | Amount of phosphoric acid based on palladium or rhodium (weight percent) | | | Ethylene | Hydrogen cyanide | Nitrogen | | |
| Palladium | 0 | 270 | 180 | 4 | 2 | 5 | 11 | 84 |
| Do | 40 | 270 | 180 | 4 | 2 | 5 | 96 | 95 |
| Rhodium | 0 | 300 | 218 | 5 | 2 | 5 | 10 | 90 |
| Do | 100 | 300 | 218 | 5 | 2 | 5 | 84 | 93 |

Catalysts were prepared in the same manners as in Example 1 using active alumina as a carrier.

TABLE 2.—EFFECTS OF AMMONIUM RHODANATE, ALUMINUM RHODANATE AND ALUMINUM CHLORIDE IN SYNTHESIS OF PROPIONITRILE FROM ETHYLENE AND HYDROGEN CYANIDE

| Catalyst | | | Temp. (°C.) | Space velocity (hr.⁻¹) | Inlet gas volume ratio | | | Hydrogen cyanide conversion (percent) | Propionitrile selectivity based on hydrogen cyanide (percent) |
|---|---|---|---|---|---|---|---|---|---|
| Palladium or rhodium | Additive | Amount of additive based on palladium or rhodium (percent) | | | Ethylene | Hydrogen cyanide | Nitrogen | | |
| Palladium | | 0 | 300 | 180 | 3 | 1 | 2 | 13 | 73 |
| | Ammonium rhodanate | 500 | 300 | 1,200 | 3 | 1 | 2 | 39 | 87 |
| | Aluminum chloride | 500 | 300 | 1,800 | 3 | 1 | 2 | 77 | 90 |
| | Aluminum rhodanate | 500 | 300 | 1,800 | 3 | 1 | 2 | 88 | 91 |
| Rhodium | | 0 | 300 | 180 | 3 | 1 | 2 | 17 | 88 |
| | Ammonium rhodanate | 380 | 300 | 1,800 | 3 | 1 | 2 | 79 | 97 |
| | Aluminum chloride | 500 | 300 | 1,800 | 3 | 1 | 2 | 80 | 92 |
| | Aluminum rhodanate | 500 | 300 | 1,800 | 3 | 1 | 2 | 91 | 93 |

Catalysts were prepared in the same manners as in Example 1 using active alumina as a carrier.

TABLE 3.—EFFECTS OF PHOSPHORIC ACID AND AMMONIUM RHODANATE IN SYNTHESIS OF PROPIONITRILE FROM ETHYLENE AND HYDROGEN CYANIDE

| Catalyst | | | Temp. (°C.) | Space velocity (hr.⁻¹) | Inlet gas volume ratio | | | Hydrogen cyanide conversion (percent) | Propionitrile selectivity based on hydrogen cyanide (percent) |
|---|---|---|---|---|---|---|---|---|---|
| Palladium or rhodium | Amount of phosphoric acid based on palladium (weight percent) | Amount of ammonium rhodanate based on palladium (weight percent) | | | Ethylene | Hydrogen cyanide | Nitrogen | | |
| Palladium | 0 | 200 | 325 | 1,800 | 5 | 2 | 5 | 52 | 82 |
| Do | 10 | 0 | 325 | 1,800 | 5 | 2 | 5 | 43 | 75 |
| Do | 10 | 500 | 325 | 1,800 | 5 | 2 | 5 | 84 | 86 |

Catalysts were prepared in the same manners as in Example 1 using active alumina as a carrier.

TABLE 4.—EFFECT OF REDUCING AGENT TREATMENT IN SYNTHESIS OF PROPIONITRILE FROM ETHYLENE AND HYDROGEN CYANIDE

| Reducing agent treatment | Hydrogen cyanide conversion (percent) | Propionitrile selectivity based on hydrogen cyanide (percent) |
|---|---|---|
| Applied | 84 | 93 |
| Not applied | 28 | 90 |

Catalyst: Palladium chloride-pyrophosphoric acid-active alumina.
Temp.: 300° C.
Space velocity: 218 hr.⁻¹.
Starting material composition: Ethylene:hydrogen cyanide:nitrogen=5:2:5 by volume.
Reducing agent treatment conditions: In hydrogen current at 300° C. for 3 hours.

TABLE 5

| Rhodium compound | | Phosphoric acid | | Carrier | | Reducing agent | Reducing treatment, temp. and time |
|---|---|---|---|---|---|---|---|
| Kind | Amount (g.) | Kind | Amount (g.) | Kind | Amount (ml.) | | |
| Rhodium chloride | 4.1 | Pyrophosphoric acid | 2.7 | Active carbon | 100 | | |
| Rhodium bromide | 5.9 | Phosphoric anhydride | 1.1 | Silica alumina | 100 | Carbon monoxide | 300° C., 3 hrs. |
| Rhodium iodide | 7.0 | Phosphoric acid | 0.3 | Boria | 100 | do | 350° C., 3 hrs. |
| Rhodium cyanide | 3.7 | Phosphoric anhydride | 1.8 | Active alumina | 100 | | |
| Rhodium acetate | 6.3 | do | 4.0 | Active carbon | 100 | Hydrogen | 300° C. |
| Do | 6.3 | Phosphoric acid | 0.9 | do | 100 | Ethylene | 250° C., 3 hrs. |
| Rhodium hydroxide | 3.0 | do | 3.0 | Active alumina | 100 | Propylene | 250° C., 3 hrs. |

| Starting material, volume ratio | | | Reaction temp. (°C.) | Space velocity (hr.⁻¹) | Hydrogen cyanide conversion (percent) | Saturated aliphatic nitrile selectivity based on hydrogen cyanide (percent) |
|---|---|---|---|---|---|---|
| Olefin | Hydrogen cyanide | Inert gas | | | | |
| Ethylene, 3 | 1 | Nitrogen, 2 | 300 | 180 | 38 | Propionitrile, 94. |
| Ethylene, 1 | 2 | Nitrogen, 7 | 300 | 350 | 17 | Propionitrile, 97. |
| Ethylene, 1 | 2 | Nitrogen, 7 | 350 | 350 | 42 | Propionitrile, 85. |
| Propylene, 2 | 1 | Nitrogen, 4 | 250 | 420 | 32 | Isobutyronitrile, 69; Normal butyronitrile, 20. |
| Propylene, 5 | 2 | Propane, 5 | 300 | 180 | 94 | Isobutyronitrile, 75; Normal butyronitrile, 17. |
| Ethylene, 3 | 1 | Ethane, 2 | 250 | 180 | 79 | Propionitrile, 93. |
| Propylene, 2 | 1 | Methane, 4 | 250 | 420 | 88 | Isobutyronitrile, 61; Normal butyronitrile, 28. |

TABLE 6

| Rhodium compound | | Amount of phosphoric acid (ml) | Amount of ammonium rhodanate (g) | Carrier | | Reducing agent | Reducing treatment temp. and time | Starting material, volume ratio | | | Reaction temp. (°C) | Space velocity (hr.⁻¹) | Hydrogen cyanide conversion (percent) | Propionitrile selectivity based on hydrogen cyanide (percent) |
|---|---|---|---|---|---|---|---|---|---|---|---|---|---|---|
| Kind | Amount (g.) | | | Kind | Amount (ml.) | | | Ethylene | Hydrogen cyanide | Inert gas | | | | |
| Rhodium acetate | 1.4 | 0.1 | 3.8 | Alumina boria | 20 | Hydrogen | 400° C., 1 hr | 1 | 1 | Nitrogen 2 | 400 | 3,600 | 82 | 81 |
| Rhodium oxalate | 1.7 | 0.5 | 4.1 | Silica alumina | 20 | do | 350° C., 1 hr | 5 | 2 | Nitrogen 5 | 350 | 2,180 | 71 | 94 |
| Rhodium cyanide | 0.7 | | 7.6 | Active carbon | 20 | do | 350° C., 1 hr | 5 | 2 | do | 350 | 2,180 | 80 | 94 |
| Rhodium bromide | 1.7 | 0.06 | 2.2 | Titania | 20 | | | 1 | 2 | Ethane 7 | 350 | 3,500 | 24 | 88 |

TABLE 7

| Palladium or rhodium compound | | Phosphoric acid | | Aluminum rhodanate or chloride | | Carrier | | Reducing Agent | Reducing treatment, temp. and time | Starting material, volume ratio | | | Reaction temp. (°C) | Space velocity (hr.⁻¹) | Hydrogen cyanide conversion (percent) | Propionitrile selectivity based on hydrogen cyanide (percent) |
|---|---|---|---|---|---|---|---|---|---|---|---|---|---|---|---|---|
| Kind | Amt. (g.) | Kind | Amt. (g.) | Kind | Amt. (g.) | Kind | Amt. (g.) | | | Ethylene | Hydrogen cyanide | Inert gas | | | | |
| Palladium iodide | 2.2 | Phosphoric acid | 0.34 | Aluminum chloride | 5.3 | Active carbon | 20 | Carbon monoxide | 300° C., 1 hr | 1 | 1 | Nitrogen, 4 | 300 | 1,800 | 75 | 92 |
| Palladium cyanide | 0.5 | | | Aluminum rhodanate | 10 | Active alumina | 20 | | | 1 | 2 | Ethane, 15 | 350 | 3,600 | 30 | 72 |
| Rhodium chloride | 0.8 | Pyrophosphoric acid | 0.2 | do | 5 | Titania | 20 | Hydrogen | 300° C., 1 hr | 5 | 2 | Nitrogen, 5 | 300 | 2,220 | 88 | 92 |
| Do | 0.8 | | | do | 5 | do | 20 | do | 300° C., 1 hr | 5 | 2 | do | 300 | 2,220 | 82 | 89 |

TABLE 8

| Palladium compound | | Phosphoric acid | | Carrier | | Reducing agent | Reducing treatment temp. and time | Starting material volume ratio | | | Reaction temp. (°C) | Space velocity (hr.⁻¹) | Hydrogen cyanide conversion (percent) | Propionitrile selectivity based on hydrogen cyanide (percent) |
|---|---|---|---|---|---|---|---|---|---|---|---|---|---|---|
| Kind | Amount (g.) | Kind | Amount (g.) | Kind | Amount (ml.) | | | Ethylene | Hydrogen cyanide | Nitrogen | | | | |
| Palladium iodide | 7.2 | Pyrophosphoric acid | 2.3 | Active carbon | 100 | Carbon monoxide | 250° C., 4 hrs | 3 | 2 | 4 | 300 | 270 | 74 | 90 |
| Palladium bromide | 5.3 | Phosphoric anhydride | 1.9 | do | 100 | do | 300° C., 4 hr | 4 | 1 | 2 | 250 | 315 | 81 | 93 |
| Palladium chloride | 3.5 | do | 0.6 | do | 100 | | | 4 | 1 | 2 | 250 | 315 | 52 | 84 |

TABLE 9

| Palladium compound | | Phosphoric acid | | Amount of ammonium rhodanate (g.) | Carrier | | Starting material volume ratio | | | Reaction temp. (°C.) | Space velocity (hr.⁻¹) | Hydrogen cyanide conversion (percent) | Propionitrile selectivity based on hydrogen cyanide (percent) |
|---|---|---|---|---|---|---|---|---|---|---|---|---|---|
| Kind | Amount (g.) | Kind | Amount (g.) | | Kind | Amount (ml.) | Ethylene | Hydrogen cyanide | Nitrogen | | | | |
| Palladium chloride. | 3.5 | Phosphoric anhydride. | 2.0 | 3.8 | Active carbon. | 100 | 3 | 2 | 5 | 300 | 2,250 | 48 | 84 |
| Palladium iodide. | 7.2 | Phosphoric acid. | 2.2 | 7.6 | Active alumina. | 150 | 4 | 1 | 3 | 350 | 3,060 | 70 | 64 |
| Palladium cyanide. | 1.0 | ...do... | 0.3 | 3.8 | Active carbon. | 100 | 3 | 1 | 2 | 350 | 3,310 | 69 | 81 |

TABLE 10-(1)

| Catalyst | Reducing agent and treatment conditions | Reaction temp. (°C.) | Starting material, volume ratio | | | Space velocity (hr.⁻¹) | Reaction results after initiation | |
|---|---|---|---|---|---|---|---|---|
| | | | Olefin | Hydrogen cyanide | Inert gas | | Hydrogen cyanide conversion (percent) | Nitrile selectivity based on hydrogen cyanide (percent) |
| Palladium cyanide (0.5 g.), phosphoric acid (1.8 g.), active alumina (20 ml.). | | 300 | Ethylene 1 | 1 | Ethane, 6 | 548 | 64 | Propionitrile, 94. |
| Rhodium chloride (0.4 g.), ammonium rhodanate (1.5 g.), active alumina (20 ml.). | Ethylene: 350° C., 1 hr. | 350 | Ethylene, 5 | 2 | Nitrogen, 5 | 2,220 | 92 | Propionitrile, 90. |
| Palladium chloride (0.7 g.), rhodium chloride (0.01 g.), phosphoric acid (1.0 g.), aluminum chloride (4.1 g.), aluminum rhodanate (1.7 g.), active alumina (20 ml.). | Hydrogen: 300° C., 3 hrs. | 300 | Propylene, 4 | 2 | Propane, 5 | 5,280 | 87 | Butyronitriles: Iso-, 61; Normal-, 30. |

TABLE 10-(2)

| Elapse time (hr.) | Reaction results after elapse of said time | | Conditions of first regeneration treatment | Reaction results after regeneration treatment | | Lowered reaction results | | |
|---|---|---|---|---|---|---|---|---|
| | Hydrogen cyanide conversion (percent) | Nitrile selectivity based on hydrogen cyanide (percent) | | Hydrogen cyanide conversion (percent) | Nitrile selectivity based on hydrogen cyanide (percent) | Elapse time (hr.) | Hydrogen cyanide conversion (percent) | Nitrile selectivity (percent) |
| 5 | 40 | 95 | Oxygen: 200° C., 4 hrs | 61 | 93 | 10 | 38 | 90 |
| 8 | 85 | 93 | Oxygen (1)+nitrogen (5)+carbon dioxide (3): 400° C., 2 hrs. | 98 | 92 | 18 | 88 | 95 |
| 5 | 62 | ¹63 ²30 | Air: 300° C., 2 hrs | 90 | ¹61 ²30 | 11 | 67 | ¹63 ²31 |

¹ Iso-.  ² Normal.

TABLE 10-(3)

| Second treatment conditions | Reaction results after treatment | | Treating conditions of nth time | | Reaction results after treatment of nth time | |
|---|---|---|---|---|---|---|
| | Hydrogen cyanide conversion (percent) | Nitrile selectivity (percent) | n | Conditions | Hydrogen cyanide conversion (percent) | Nitrile selectivity (percent) |
| Air: 500° C., 0.5 hr | 74 | 90 | 6 | Air: 300° C., 2 hrs | 75 | 91 |
| Air: 300° C., 1 hr | 98 | 93 | 40 | Air: 350° C., 1 hr | 98 | 93 |
| Air: 300° C., 2 hrs | 90 | ¹61 ²30 | 7 | Air: 300° C., 1 hr | 92 | ¹62 ²29 |

¹ Iso-.  ² Normal-.

In Table 10, reaction results after initiation and after treatment are the results obtained at 0.5 hour after the feeding of starting material, and the reactions and regeneration conditions from the second to nth time are the same as in the second treatment.

What is claimed is:

1. A process for producing saturated aliphatic nitriles which comprises subjecting a gas containing a lower olefinic hydrocarbon selected from the group consisting of ethylene and propylene and hydrogen cyanide to a catalytic addition reaction at a temperature of 200°–600° C. in the presence of a catalyst consisting of (a): at least one member selected from the group consisting of palladium, rhodium, the oxides, cyanides, halides, hydroxides, acetates and oxalates of palladium and rhodium; and (b): at least one compound selected from the group consisting of phosphoric acid, ammonium rhodanate, aluminum rhodanate and aluminum chloride.

2. A process according to claim 1 wherein the lower olefinic hydrocarbon is ethylene and propionitrile is produced.

3. A process according to claim 1 wherein the lower olefinic hydrocarbon is propylene and isobutyronitrile and normal butyronitrile are produced.

4. A process according to claim 1 wherein the lower olefinic hydrocarbon and the hydrogen cyanide are present in a molar ratio of from 20:1 to 1:20.

5. A process according to claim 1 wherein the phosphoric acid is selected from the group consisting of phosphoric acid, pyrophosphoric acid and phosphoric anhydride and is used in an amount of 5 to 200% by weight based on the amount of palladium and/or rhodium.

6. A process according to claim 1 wherein said at least one member of the group consisting of ammonium rhodanate, aluminum rhodanate and aluminum chloride is used in an amount of 6 to 30,000% by weight based on the amount of palladium and/or rhodium.

7. A process according to claim 1 comprising treating the catalyst with a reducing agent selected from the group consisting of hydrogen, an aliphatic hydrocarbon, carbon monoxide, and Formalin at a temperature of from 30° to 500° C.

8. A process according to claim 1 wherein the catalyst is supported on a carrier selected from the group consisting of active carbon, alumina, silica alumina, titania, silica, boria and alumina boria.

9. A process according to claim 1 wherein the temperature is from 200° to 450° C.

10. A process according to claim 1 wherein the reaction is effected in the presence of an inert gas selected from the group consisting of nitrogen, methane, ethane, propane and carbon dioxide.

11. A process according to claim 1 wherein the reaction is effected under the conditions of a fixed bed, a movable bed or a fluidized bed.

12. A process according to claim 1 comprising regenerating the catalyst by heating same at a temperature of 200° to 600° C. in a stream of oxygen or a molecular oxygen-containing gas.

References Cited
UNITED STATES PATENTS

| | | | |
|---|---|---|---|
| 3,057,906 | 10/1962 | Fierce et al. | 260—465.3 |
| 3,278,575 | 10/1966 | Davis et al. | 260—465.3 |
| 3,278,576 | 10/1966 | Davis | 260—465.3 |

JOSEPH P. BRUST, *Primary Examiner.*